(12) United States Patent
Ding et al.

(10) Patent No.: US 6,526,463 B1
(45) Date of Patent: Feb. 25, 2003

(54) DYNAMICALLY SELECTABLE STACK FRAME SIZE FOR PROCESSOR INTERRUPTS

(75) Inventors: Zhimin Ding, Sunnyvale, CA (US); Gregory K. Goodhue, San Jose, CA (US); Ata R. Khan, Saratoga, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/548,988

(22) Filed: Apr. 14, 2000

(51) Int. Cl.[7] .................... G06F 9/42; G06F 15/00
(52) U.S. Cl. ............. 710/261; 710/260; 712/233; 712/208
(58) Field of Search .................. 710/261–267, 710/260; 712/239, 208, 233, 210

(56) References Cited

U.S. PATENT DOCUMENTS

| 4,783,730 A | * | 11/1988 | Fischer | 710/5 |
| 5,499,379 A | * | 3/1996 | Tanaka et al. | 709/103 |
| 5,566,334 A | * | 10/1996 | Loader | 709/100 |
| 5,611,061 A | * | 3/1997 | Yasuda | 712/244 |
| 5,887,189 A | * | 3/1999 | Birns et al. | 711/202 |
| 5,956,511 A | * | 9/1999 | Tahara | 710/260 |
| 5,974,440 A | * | 10/1999 | Brooks et al. | 709/100 |
| 5,978,907 A | * | 11/1999 | Tran et al. | 712/239 |
| 6,175,890 B1 | * | 1/2001 | Yamaura | 710/267 |
| 6,336,178 B1 | * | 1/2002 | Favor | 712/209 |

* cited by examiner

Primary Examiner—Gopal C. Ray
(74) Attorney, Agent, or Firm—Michael Schmitt

(57) ABSTRACT

A processing system with extended addressing capabilities includes a control bit that controls the number of address bytes that are stored onto a program stack. If the control bit is set to a first state, the address is pushed onto the program stack in the same manner as that used for shorter-address legacy devices. If the control bit is set to a second state, the address is pushed onto the program stack using the number of bytes required to contain a longer extended address. This same control bit controls the number of bytes that are popped off the stack upon return from an interrupt subroutine. The state of the control bit is controlled by one or more program instructions, thereby allowing it to assume each state dynamically. This dynamic control of the number of bytes pushed and popped to and from the stack allows for an optimization of stack utilization, and thereby further compatibility with legacy devices and applications.

14 Claims, 2 Drawing Sheets

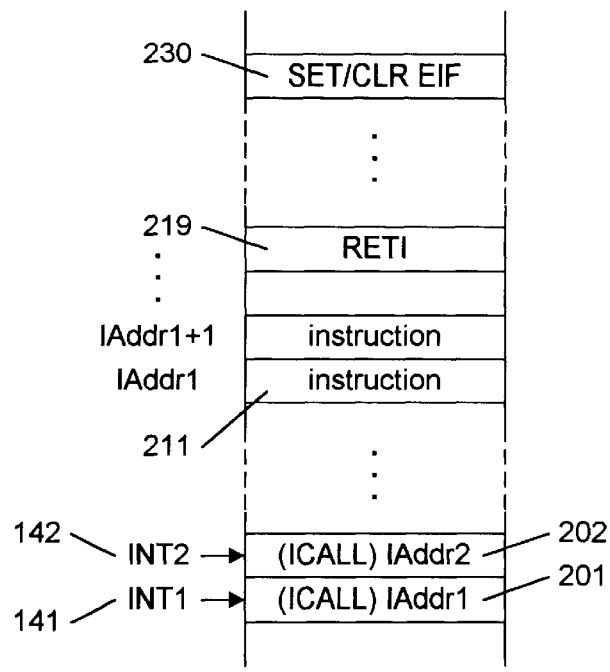
FIG. 2A
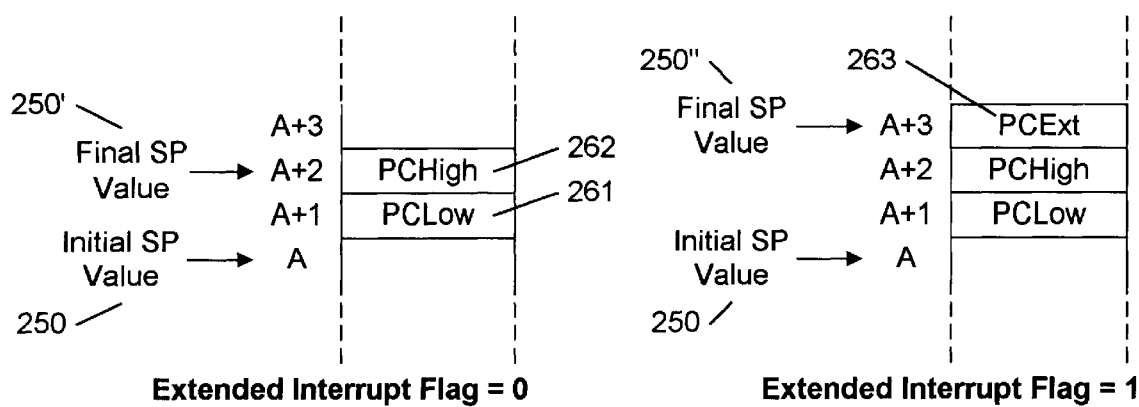
FIG. 2B
FIG. 2C

DYNAMICALLY SELECTABLE STACK FRAME SIZE FOR PROCESSOR INTERRUPTS

BACKGROUND OF THE INVENTION

1. Field of the Invention

This invention relates to the field of microprocessors, and in particular to microprocessors having an extended address space.

2. Description of Related Art

An 8-bit data structure and 16-bit address structure has been, and continues to be, a common architecture for low cost microprocessors, or microcontrollers, such as the 80C51 family of processors, and others, that have a legacy that extends back for decades. During these decades, a number of software/firmware applications and routines have been developed.

To remain competitive, application developers continually add features and functions to devices that use microprocessors. Unfortunately, the 16-bit address structure of common processors limits the size of programs, or the amount of data, that can be embodied within these devices. Larger capacity devices, such as 32-bit processors, can address a larger program or data space, but are typically more expensive than conventional 8-bit processors. Moving an existing application from one processor family to another in order to provide a larger addressable space for adding additional features, however, typically requires a substantial investment. The development personnel must be trained to use the new processor; libraries of "utility programs", such as mathematical routines and interrupt routines, must be rewritten for the new processor; time-dependent routines must be tested and verified on the new processor; idiosyncratic behavior of the new processor must be discovered and overcome; and so on.

Expanding the addressing space of an existing processor alleviates a number of the difficulties associated with a transition to a new processor, but also introduces a number of compatibility issues with applications and routines that were developed for the existing shorter-address processor. Consider, for example, the effect of a larger addressing space on the operation of a conventional stack. When a subroutine is called, the location of the address to which the subroutine should return is "pushed" onto the stack. When a return is executed from the subroutine, the appropriate number of bytes must be "popped" off the stack. The number of bytes popped off the stack corresponding to an address must equal the number of bytes pushed onto the stack. A straightforward solution would be to always push the largest number of address bytes onto the stack, and to always pop this largest number of bytes off the stack. As is known in the art, however, stack resources are often limited, and, because stack utilization is dynamic and often condition-dependent, a maximum required stack size is difficult, and sometimes impossible, to determine. This is particularly problematic with regard to interrupt-driven processes. Each time an interrupt is received, the 'next-address' is pushed onto the stack and an address associated with the processing of the particular interrupt becomes the 'next-address'. If the interrupt calls another process, another address is pushed onto the stack. These addresses remain on the stack until the process associated with the interrupt is completed. If an additional interrupt occurs before the original interrupt is completed, one or more additional addresses will be pushed onto the stack. If an address is pushed onto the stack beyond the limits of the stack (a "stack-overflow" error), unpredictable results will occur. As is also known in the art, stack overflow errors are extremely difficult to diagnose. Increasing each pushed and popped address from two bytes (16-bits) to three bytes could amount to a 50% increase in stack utilization. Such a large increase in stack utilization may preclude the use of this technique for a number of legacy applications, due to the increased likelihood of stack overflow errors.

BRIEF SUMMARY OF THE INVENTION

It is an object of this invention to provide a processing system and method that allows for extended memory addressing while maintaining compatibility with legacy devices. It is a further object of this invention to provide a processing system and method that allows for a dynamic control of stack allocation and utilization. It is a further object of this invention to provide a processing system and method that allows for a dynamic control of stack allocation and utilization for interrupt processing.

These objects and others are achieved by providing a processing system with extended addressing capabilities, and with a control bit that controls the number of address bytes that are stored onto a program stack. If the control bit is set to a first state, the address is pushed onto the program stack in the same manner as that used for shorter-address legacy devices. If the control bit is set to a second state, the address is pushed onto the program stack using the number of bytes required to contain a longer extended address. This same control bit controls the number of bytes that are popped off the stack upon return from an interrupt subroutine. The state of the control bit is controlled by one or more program instructions, thereby allowing it to assume each state dynamically. This dynamic control of the number of bytes pushed and popped to and from the stack allows for an optimization of stack utilization, and thereby further compatibility with legacy devices and applications.

BRIEF DESCRIPTION OF THE DRAWINGS

The invention is explained in further detail, and by way of example, with reference to the accompanying drawings wherein:

FIGS. 2A–2C illustrate an example program and stack operation in accordance with this invention.

Throughout the drawings, the same reference numerals indicate similar or corresponding features or functions.

DETAILED DESCRIPTION OF THE INVENTION

Figure 1:
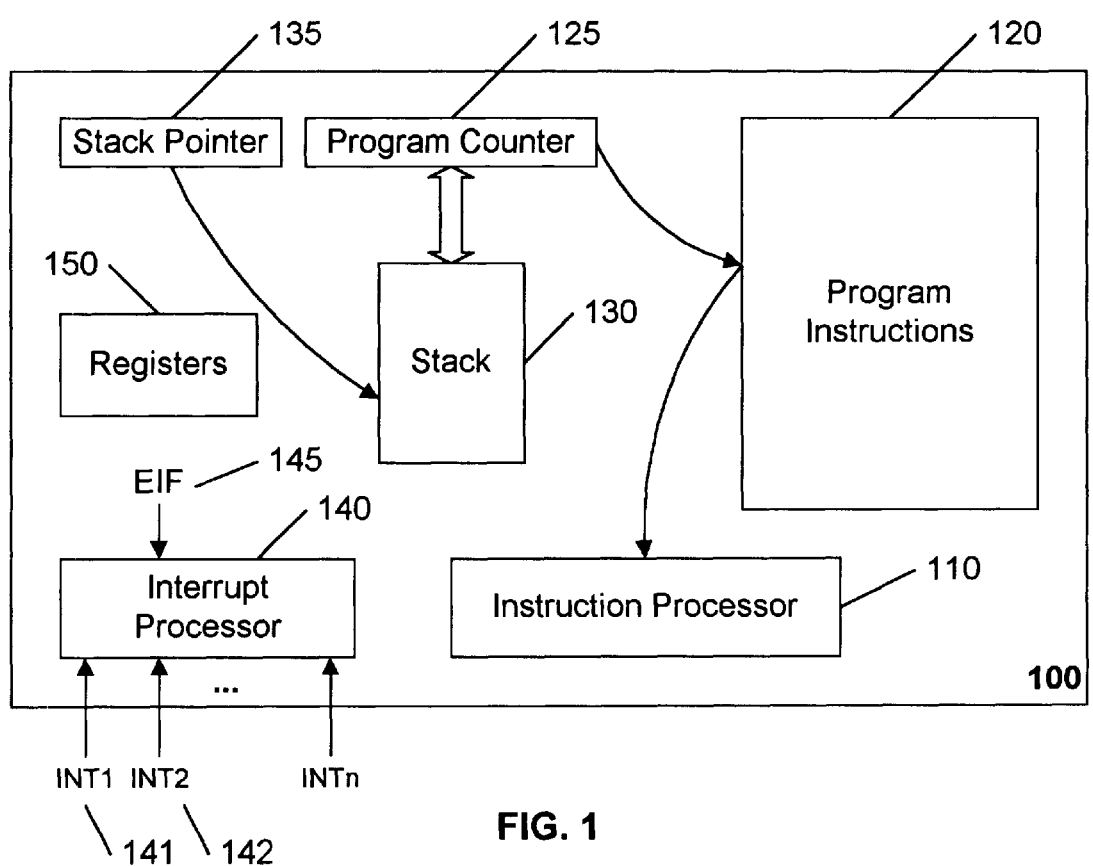
FIG. 1 illustrates an example block diagram of a processing system architecture that is suitable for use in accordance with this invention.

FIG. 1 illustrates an example block diagram of a processing system 100 in accordance with this invention. The processing system 100 includes an instruction processor 110 that executes a sequence of program instructions 120. The program instructions 120 are located in a memory that may be integrated on the same integrated circuit as the instruction processor 110, or external to the integrated circuit, or a combination of both, wherein some of the instructions are in an internal memory and some are in an external memory. The program counter 125 controls the sequence of instructions 120 that are executed by containing the address of the 'next-instruction' as each instruction is executed. Most often, the program counter 125 is merely incremented by each instruction's size, so that the execution progresses from one instruction to the next in a sequential manner. Some instructions, however, modify the contents of the program counter 125 to effect an execution of instructions at another segment of the instruction code. For example, in a continuous-operation application, when the instruction processor 110 executes the last instruction in the program instructions 120, the content of the program counter is modified to contain the address of an instruction back at the beginning of the program instructions 120.

The processing system 100 also contains a stack 130 and a stack pointer 135. Often, the flow of a program involves a "call" to a subroutine at another segment of the instruction code to perform a particular task. Subroutines are often utility programs that may be called from any location in the program instructions 120. When the task is completed, the program is expected to continue from the point at which the subroutine was called. To effect the return to the proper address, the address of the 'next-instruction' is pushed onto the stack 130 from the program counter 125 when the subroutine is called, and then is popped from the stack 130 into the program counter 125 when the subroutine completes. Because a number of addresses, and other items, may be pushed onto the stack, a block of memory is typically allocated for containing the stack 130, and a stack pointer 135 is provided to address the current location in memory for storing the next set of bytes that are pushed onto the stack 130. This stack pointer is incremented by the number of bytes pushed onto the stack, and decremented by the number of bytes popped from the stack, so that after each push and pop operation, it continues to contain the address of the current top of the stack 130. The stack 130 may be located in an internal or external memory, or a combination of both.

The processing system 100 also includes an interrupt processor 140 that is configured to respond to interrupt events, which may be internal or external events. For example, an external event may be the receipt of a bit of information on a serial port, or a transition caused by the opening or closing of a switch, and so on. An internal event may be a timing signal that triggers the transmission of a bit of information on the serial port at a given bit rate, or an expiration of a watch-dog timer function, and so on. These interrupt events appear as signals on the interrupt inputs INT1 141, INT2 142, etc. of the interrupt processor 140. As is common in the art, when an interrupt occurs the interrupt processor 140 effects a call to a subroutine that corresponds to the particular interrupt, as illustrated in FIG. 2A. Typically, a particular memory location 201, 202, etc. is associated with each interrupt input INT1 141, INT2 142, etc. The set of memory locations corresponding to the set of interrupt inputs is termed the "interrupt vector". Instructions located at each corresponding memory location are executed when the interrupt occurs. To conserve memory space, the interrupt vector in some processors only contains only the address of a subroutine that is to be executed when the interrupt occurs, and the effect of the occurrence of an address in the interrupt vector is equivalent to a program instruction to call the subroutine. For ease of reference and understanding, the memory locations 201, 202 are illustrated with the corresponding interrupt call (ICALL) instruction in parentheses.

Also for ease of reference, a distinction is not made herein between implicit and explicit instructions, and the scope of this invention is not limited to either. For the purposes of this invention, an instruction corresponds to a cause of an action by the processing system 100. As is known in the art, the cause of a processor's action may be the decoding of a sequence of bits in a program register, a predefined response to an internal event, a programmed response to an external event, and combinations of these sequencing methods and others, depending upon the particular processor's design. In response to an interrupt INT1 141, for example, in one embodiment, the processing system 100 may effect an implicit call to a subroutine at the address IAddr1 that is located at the corresponding memory location 201. In an alternative embodiment, the processing system 100 may effect the call to the subroutine in response to an explicit "ICALL IAddr1" instruction that is located at the corresponding memory location 201. Whether implicit or explicit, a call to a subroutine at a specified address is executed in response to an interrupt. As discussed above with regard to FIG. 1, a call to a subroutine causes the content of the program counter 125 to be pushed onto the stack 130.

In accordance with this invention, the program counter is configured to contain an "extended address". For the purposes of this disclosure, an extended address is an address field that may contain a larger numerical value than a non-extended address field. In the context of this invention, the non-extended address field corresponds to the conventional two-byte (16-bit) address field of a typical 8-bit processing system, such as the 80C51 family of processors, and the extended address field is a three-byte (24-bit) address field of a processing system of this invention that is designed to be compatible with programs that were developed for the conventional 8-bit processing system with 16-bit addressing. A 16-bit address is stored in the three-byte address field of the processing system of this invention by setting the upper order byte to zero and storing the 16-bit address into the lower two bytes of the three-byte address field. For ease of reference, a two-byte non-extended address field and a three-byte extended address field are used hereinafter, although one of ordinary skill in the art will appreciate that this invention is not limited to two-byte and three-byte fields.

Although the program counter 125 of the processing system 100 of FIG. 1 is three bytes wide, the processing system 100 of this invention allows for either two bytes or three bytes of the contents of the program counter 125 to be pushed onto the stack in response to an interrupt call (ICALL) instruction. An extended-interrupt flag 145 controls whether the interrupt processor 140 effects a two-byte or three-byte push of the contents of the program counter 125 onto the stack 130. In a preferred embodiment, the extended-interrupt flag 145 is a programmable bit in a set of registers 150 used to control the operation of the various components of the processing system 100. The extended-interrupt flag 145 also controls whether the return from the interrupt subroutine (RETI) effects a two-byte or three-byte pop from the stack 130 into the program counter 125. If it is known, for example, that the execution of the program instructions 120 during a particular segment or time period will only include program instructions with addresses of 16 bits or fewer, the extended-interrupt flag 145 can be set to effect a two-byte push and pop during this segment or time period. In this manner, whenever an interrupt occurs during this segment or time period, only two bytes of stack memory will be used for storing the return address. When it is known that program instructions at addresses above 16-bits (64K) may be executed, and potentially interrupted, the extended-interrupt flag 145 is set to effect a three-byte push and pop for each ICALL instruction. Obviously, if the addresses of the potential program instructions are unknown, the extended-interrupt flag 145 is set to effect the three-byte push and pop.

FIG. 2B illustrates the operation of an example stack when the extended-interrupt flag is set to the non-extended state (two-byte mode), and FIG. 2C illustrates the operation of the example stack when the extended-interrupt flag is set to the extended state (three-byte mode). In FIG. 2B, an initial stack pointer SP value 250 is illustrated as pointing to an address A that corresponds to a current top of the stack. In the two-byte mode, the low order byte PCLow 261 is stored atop the stack, at address A+1, and the next higher order byte PCHigh 262 is stored atop that, at address A+2. The stack pointer SP value 250' is updated to point to the new top of stack, A+2. In a preferred embodiment, the extended-interrupt flag defaults to the non-extended state, to provide compatibility with legacy applications.

In FIG. 2C, corresponding to the three-byte state of the extended-interrupt flag, after storing the PCLow and PCHigh bytes atop the stack, the next higher order (extended) byte PCExt 263 is stored atop them, at address A+3. The stack pointer SP value 250" is updated to point to the new top of stack, A+3.

The called interrupt subroutine at IAddr1 is illustrated in FIG. 2A as containing a sequence of instructions, at IAddr1, IAddr1+1, etc. that are executed when the processing system 100 executes the ICALL IAddr1 instruction in response to an interrupt on input INT1 141. At the end of the subroutine, a return instruction RETI 219 is executed. The state of the extended-interrupt flag determines whether two bytes or three bytes are removed from the stack in response to this RETI instruction. If the extended interrupt flag is in the two-byte mode, corresponding to FIG. 2B, the PCHigh 262 byte is popped off the stack (130 of FIG. 1) and placed into the second order byte of the program counter (125 of FIG. 1), and the PCLow 261 is popped off the stack and placed into the low order byte of the program counter. The execution of the program continues at the address formed by the combination of the PCHigh and PCLow bytes. If the extended interrupt flag is in the three-byte mode, corresponding to FIG. 2C, the PCExt 263 byte is popped off the stack and placed into the third order byte of the program counter, and the PCHigh and PCLow bytes are popped off the stack and placed into the two lower order bytes of the program counter, as discussed above. The execution of the program continues at the address formed by the combination of the PCExt, PCHigh, and PCLow bytes. In both cases, the stack pointer SP value 250 is decremented to correspond to the top of the stack, A, before the interrupt routine was called, provided that the same number of bytes were pushed and popped from the stack at the execution of the ICALL and RETI instructions, respectively.

As would be evident to one of ordinary skill in the art, the dynamic control of the number of bytes pushed and popped to and from the stack allows for a high degree of stack utilization optimization, but also requires care to assure that a synchronization is maintained between the state of the extended-interrupt flag when the ICALL instruction is executed and when the RETI instruction is executed. The number of bytes pushed onto the stack by the ICALL instruction must match the number of bytes removed from the stack by the RETI instruction, otherwise, the stack pointer SP 250 will be pointing to a different location before and after the call to the interrupt subroutine. In a preferred embodiment, automated tools, such as compilers and linkers maintain control of the extended-interrupt flag, and insert the appropriate commands 230 that set the extended-interrupt flag to the desired state at select points in the program instructions.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

We claim:

1. A processing system that is configured to execute program instructions that are stored in a memory, comprising:

an extended-interrupt flag, and a stack that is configured to store bytes of data, wherein the processing system is configured to execute:
   a first instruction that controls a state of the extended-interrupt flag,
   a second instruction that places an address onto the stack, and
   a third instruction that retrieves the address from the stack; and the address comprises a plurality of bytes that are stored onto the stack, a size of the plurality being determined by the state of the extended-interrupt flag.

2. The processing system of claim 1, wherein the second instruction also causes the processing system to increment a stack pointer by an amount corresponding to the size of the plurality, and the third instruction also causes the processing system to decrement the stack pointer by the amount corresponding to the size of the plurality.

3. The processing system of claim 1, wherein the second instruction corresponds to an interrupt event, and the third instruction corresponds to a return-from-interrupt instruction.

4. The processing system of claim 1, wherein the processing system is also configured to execute program instructions corresponding to an 80C51 instruction set.

5. The processing system of claim 1, wherein the third instruction is further configured to cause the processing system to execute program instructions that are located at the address that is retrieved from the stack.

6. The processing system of claim 1, wherein the address corresponds to a program counter that controls a sequencing of the program instructions that are executed by the processing system.

7. A method of controlling a sequence of program instructions, wherein the sequence of program instructions is controlled by a program counter, the method comprising:

executing a first instruction that controls a state of an extended-interrupt flag, executing a second instruction that:
   places a current-instruction address from the program counter onto a stack and
   places a jump-address into the program counter,
   executing at least one instruction based on the jump address, executing a third instruction that
   places the current-instruction address from the stack into the program counter, and executing at least one instruction based on the current-instruction address, wherein the current-instruction address contains a plurality of bytes that are stored onto the stack, a size of the plurality being determined by the state of the extended-interrupt flag.

8. The method of claim 7, wherein executing the second instruction also includes incrementing a stack pointer by an amount corresponding to the size of the plurality, and executing the third instruction also includes decrementing the stack pointer by the amount corresponding to the size of the plurality.

9. The method of claim 7, wherein the second instruction corresponds to an interrupt event, and the third instruction corresponds to a return-from-interrupt instruction.

10. The method of claim 7, wherein the at least one instruction based on the jump address corresponds to one or more instructions in an 80C51 instruction set.

11. The method of claim 7, wherein executing the third instruction causes execution of program instructions that are located at the address that is retrieved from the stack.

12. A processor comprising:

a memory, an instruction processor, operably coupled to the memory, that is configured to process a program instruction that is contained at an instruction address in the memory, a program counter, operably coupled to the instruction processor, that is configured to provide the instruction address to the instruction processor, the program counter having a predetermined size, and a stack, operably coupled to the program counter, that is configured to store a number of bits from the program counter corresponding to the instruction address, wherein, the number of bits corresponding to the instruction address that is stored in the stack is determined by a state of a control item, and in at least one state of the control item, the number of bits corresponding to the instruction address that is stored in the stack is less than the size of the program counter.

13. The processor of claim 12, wherein the size of the program counter is at least 24 bits, and in the at least one state of the control item, the number of bits corresponding to the instruction address that is stored in the stack is less than 17 bits.

14. The processor of claim 12, wherein the number of bits corresponding to the instruction address is stored in the stack in response to an interrupt request.

* * * * *